(12) United States Patent
Xiong

(10) Patent No.: US 11,132,430 B2
(45) Date of Patent: Sep. 28, 2021

(54) LOGIN METHOD AND APPARATUS AND ELECTRONIC DEVICE

(71) Applicant: Advanced New Technologies, Co., Ltd., Grand Cayman (KY)

(72) Inventor: Wuzhen Xiong, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 25 days.

(21) Appl. No.: 16/810,619

(22) Filed: Mar. 5, 2020

(65) Prior Publication Data
US 2020/0201974 A1 Jun. 25, 2020

Related U.S. Application Data

(63) Continuation of application No. PCT/CN2018/110671, filed on Oct. 17, 2018.

(30) Foreign Application Priority Data
Dec. 4, 2017 (CN) .......................... 201711261253.4

(51) Int. Cl.
*G06F 21/32* (2013.01)
*G06N 20/00* (2019.01)
(Continued)

(52) U.S. Cl.
CPC .............. *G06F 21/32* (2013.01); *G06F 3/015* (2013.01); *G06F 21/31* (2013.01); *G06F 21/36* (2013.01);
(Continued)

(58) Field of Classification Search
None
See application file for complete search history.

(56) References Cited

U.S. PATENT DOCUMENTS 8,679,012 B1* 3/2014 Kayyali ................ A61B 5/318 600/301
9,100,825 B2* 8/2015 Schultz ................ H04W 12/06
(Continued)

FOREIGN PATENT DOCUMENTS

CN 103729586 4/2014
CN 105100097 11/2015
(Continued)

OTHER PUBLICATIONS

Wu et al.; "Real-time EEG-based Person Authentication System Using Face Rapid Serial Visual Presentation"; 2017; Retrieved from the Internet https://ieeexplore.ieee.org/abstract/document/8008414; pp. 1-4, as printed. (Year: 2017).*
(Continued)

*Primary Examiner* — Saleh Najjar
*Assistant Examiner* — Michael W Chao
(74) *Attorney, Agent, or Firm* — Fish & Richardson P.C.

(57) ABSTRACT

One or more implementations of the present specification provide a login method. A set of dynamic information is displayed on a user-device, in which the set of dynamic information is displayed as a part of a login process. A first electroencephalogram (EEG) signal indicative of a user-response to the displayed dynamic information is received, in which the EEG signal is detected by a monitoring device. It is determined that the first EEG signal matches a second EEG signal that corresponds to the displayed dynamic information stored in a login authentication library. The login authentication library stores a plurality of template EEG signals obtained from users (during an enrollment process) as responses to corresponding sets of dynamic information. In response to determining that the first EEG signal matches the second EEG signal, a login request is transmitted to a server.

27 Claims, 3 Drawing Sheets

(51) Int. Cl.
  *G06F 3/01* (2006.01)
  *G06F 21/36* (2013.01)
  *H04W 12/06* (2021.01)
  *H04L 29/06* (2006.01)
  *G06F 21/31* (2013.01)
(52) U.S. Cl.
  CPC ......... *G06N 20/00* (2019.01); *H04L 63/0861* (2013.01); *H04L 63/105* (2013.01); *H04W 12/068* (2021.01)

(56) References Cited

U.S. PATENT DOCUMENTS

| | | | |
|---|---|---|---|
| 9,305,155 B1* | 4/2016 | Vo | H04L 63/0861 |
| 9,509,688 B1 | 11/2016 | Magi Shaashua et al. | |
| 10,405,186 B1* | 9/2019 | Latsha | G06F 21/31 |
| 10,470,690 B2* | 11/2019 | Hasegawa | A61B 5/117 |
| 10,581,853 B2* | 3/2020 | Zhu | H04L 63/0853 |
| 10,702,705 B2* | 7/2020 | Malchano | A61N 1/36025 |
| 10,708,777 B2* | 7/2020 | Kim | H04L 63/126 |
| 10,713,350 B2* | 7/2020 | Mehta | H04L 9/3226 |
| 10,799,180 B2* | 10/2020 | Gunasekar | G06F 3/012 |
| 10,803,145 B2* | 10/2020 | Driscoll | G16H 40/63 |
| 10,814,131 B2* | 10/2020 | Goldwasser | A61N 1/0456 |
| 10,826,910 B2* | 11/2020 | Disraeli | H04L 63/083 |
| 10,846,693 B2* | 11/2020 | Ross | G06F 21/44 |
| 10,869,620 B2* | 12/2020 | Longinotti-Buitoni | G06K 9/4609 |
| 2009/0063866 A1 | 3/2009 | Navratil et al. | |
| 2013/0269013 A1* | 10/2013 | Parry | H04L 63/10 726/7 |
| 2014/0020089 A1* | 1/2014 | Perini, II | A61B 5/117 726/19 |
| 2014/0303450 A1* | 10/2014 | Caponi | A61B 5/165 600/301 |
| 2014/0366111 A1* | 12/2014 | Sheller | G06F 21/31 726/7 |
| 2016/0004862 A1* | 1/2016 | Almehmadi | G06F 21/6218 726/25 |
| 2016/0103487 A1* | 4/2016 | Crawford | A61B 5/0484 600/544 |
| 2016/0183812 A1* | 6/2016 | Zhang | A61B 5/7246 600/301 |
| 2016/0210407 A1* | 7/2016 | Hwang | G06K 9/00885 |
| 2016/0342782 A1* | 11/2016 | Mullins | G06F 21/32 |
| 2017/0078281 A1 | 3/2017 | Lu | |
| 2017/0215011 A1* | 7/2017 | Goldstein | H04R 25/305 |
| 2017/0228526 A1* | 8/2017 | Cudak | H04L 63/0861 |
| 2017/0337352 A1* | 11/2017 | Williams | G06T 19/006 |
| 2017/0346817 A1* | 11/2017 | Gordon | G06F 3/013 |
| 2018/0000367 A1* | 1/2018 | Longinotti-Buitoni | G06F 3/017 |
| 2018/0007062 A1* | 1/2018 | Maheshwari | G06F 21/45 |
| 2019/0058703 A1 | 2/2019 | Zhu | |
| 2019/0149542 A1* | 5/2019 | Scopis | G06F 21/40 726/7 |
| 2019/0216392 A1* | 7/2019 | Bower | G16H 20/30 |
| 2021/0124422 A1* | 4/2021 | Forsland | G06F 1/163 |

FOREIGN PATENT DOCUMENTS

| | | |
|---|---|---|
| CN | 105512534 | 4/2016 |
| CN | 105590045 | 5/2016 |
| CN | 106251438 | 12/2016 |
| CN | 106503517 | 3/2017 |
| CN | 106503527 | 3/2017 |
| CN | 206097118 | 4/2017 |
| CN | 107277075 | 10/2017 |
| CN | 107393214 | 11/2017 |
| CN | 108108603 | 6/2018 |
| CN | 108108974 | 6/2018 |
| CN | 108234130 | 6/2018 |
| EP | 2743873 | 6/2014 |
| TW | 201812517 | 4/2018 |

OTHER PUBLICATIONS

PCT Written Opinion of the International Searching Authority in International Application No. PCT/CN2018/110671, dated Dec. 29, 2018, 8 pages (with English translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Appln. No. PCT/CN2018/110671, dated Dec. 29, 2018.
PCT International Preliminary Reporton Patentability in International Application No. PCT/CN2018/110671, dated Jun. 9, 2020, 9 pages (with English translation).
Extended European Search Report in European Application No. 18886664.4, dated Sep. 30, 2020, 8 pages.

* cited by examiner

LOGIN METHOD AND APPARATUS AND ELECTRONIC DEVICE

CROSS-REFERENCE TO RELATED APPLICATIONS

This application is a continuation of PCT Application No. PCT/CN2018/110671, filed on Oct. 17, 2018, which claims priority to Chinese Patent Application No. 201711261253.4, filed on Dec. 4, 2017, and each application is hereby incorporated by reference in its entirety.

TECHNICAL FIELD

Implementations in this specification relate to the field of internet technologies, and in particular, to a login method and apparatus and an electronic device.

BACKGROUND

To ensure security of user accounts, existing login methods provide security policies that include setting login passwords. However, the login passwords are at risk of being stolen.

SUMMARY

Implementations in this specification provide a login method and apparatus and an electronic device:

According to a first aspect of the implementations in this specification, a login method is provided, and the method includes: displaying dynamic information for login to a user; receiving an EEG signal that is generated by the user based on the displayed dynamic information and that is detected by a monitoring device; matching the detected EEG signal with an EEG signal that corresponds to the dynamic information in a login authentication library, where EEG signals generated by users based on various dynamic information are stored in the login authentication library; and logging in when the detected EEG signal is successfully matched with the EEG signal that corresponds to the dynamic information in the login authentication library.

According to a second aspect of the implementations in this specification, a login apparatus is provided, and the apparatus includes: a displaying unit, configured to display dynamic information for login to a user; a receiving unit, configured to receive an EEG signal that is generated by the user based on the displayed dynamic information and that is detected by a monitoring device; a matching unit, configured to match the detected EEG signal with an EEG signal that corresponds to the dynamic information in a login authentication library, where EEG signals generated by users based on various dynamic information are stored in the login authentication library; and a login unit, configured to log in when the detected EEG signal is successfully matched with the EEG signal that corresponds to the dynamic information in the login authentication library.

According to a third aspect of the implementations in this specification, an electronic device is provided and includes: a processor; and a memory, configured to store an instruction that can be executed by the processor; where the processor is configured to: display dynamic information for login to a user; receive an EEG signal that is generated by the user based on the displayed dynamic information and that is detected by a monitoring device; match the detected EEG signal with an EEG signal that corresponds to the dynamic information in a login authentication library, where EEG signals generated by users based on various dynamic information are stored in the login authentication library; and log in when the detected EEG signal is successfully matched with the EEG signal that corresponds to the dynamic information in the login authentication library.

Implementations of this specification provide a login method by using EEG derived from human brain consciousness. A user's brain generates an EEG signal based on dynamic information displayed on a login device. The EEG signal is then converted into a login command for a login system after being collected, processed, and analyzed. The dynamic information is similar to a dynamic password that is random and disposable. Therefore, compared with the conventional login method, the login method using EEG derived from human brain consciousness is securer, more private, more interesting, and more user-friendly.

DESCRIPTION OF IMPLEMENTATIONS

Figure 1:
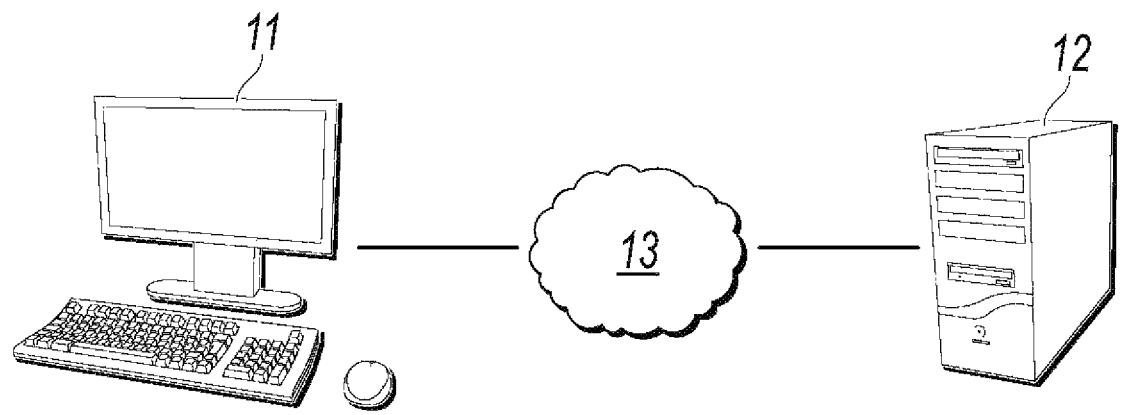
FIG. 1 is a system architecture diagram illustrating login, according to an implementation of this specification.

Example implementations are described in detail here, and examples of the example implementations are presented in the accompanying drawings. When the following descriptions relate to the accompanying drawings, unless otherwise specified, same numbers in different accompanying drawings represent a same or similar element. Implementations described in the following do not represent all implementations consistent with the present disclosure. On the contrary, they are merely examples of devices and methods consistent with some aspects of this specification as detailed in the appended claims.

The terms used in this specification are merely for the purpose of illustrating specific implementations, and are not intended to limit this specification. The terms "a", "the", and "this" of singular forms used in this specification and the appended claims are also intended to include plural forms, unless otherwise specified in the context clearly. It should also be understood that, the term "and/or" used in this specification indicates and includes any or all possible combinations of one or more associated listed items.

It should be understood that although terms "first", "second", and "third" are used in this specification to describe various information, the information is not limited by the terms. These terms are only used to distinguish between information of the same type. For example, without departing from the scope of this specification, the first information can be named the second information, and similarly, the second information can be named the first information. Depending on the context, for example, words "if" used here can be explained as "while" or "when" or "in response to determining".

As mentioned above, to ensure security of user accounts, existing login methods provide security policies that include setting login passwords. The login passwords here can include either a conventional numeric character password or a password (such as fingerprints, iris, etc.) based on collected users' biometric information. However, the passwords set in the above method have a common defect of being fixed.

Generally, users' biometric information is unique and is fixed after collection. If the users' biometric information is leaked or obtained by someone else, user accounts are easily stolen. For example, if a user's fingerprint is collected by someone else, the person who collects the fingerprint can make the user's fingerprint film and then log in to the user account by using the fingerprint film.

Similarly, the numeric character password set by the user is fixed until the user modifies the password. Conventional numeric character passwords are more likely to be stolen. If a user's mobile device is implanted with a Trojan virus, the user's login password can be easily collected.

Therefore, passwords remain at risk of being stolen in the existing login methods.

This specification provides a login method based on users' EEG, and the method can improve security of user login. Basic concepts of electroencephalogram (EEG) are described in the following:

EEG can be a recording method that records human brain activities by using electrophysiological indicators. When a human brain is active, postsynaptic potentials generated by a large number of neurons simultaneously can form EEG after summation. EEG can mainly record changes of electric waves when the human brain is active, and reflect overall electrophysiological activities of cerebral nerve cells in the cortex or on the scalp. The EEG is derived from the postsynaptic potentials of the apical dendrites of pyramidal cells. The formation of synchronic rhythms of EEG is also related to activities of the non-specific thalamocortical projection system.

The EEG is neuroelectrical activities of spontaneous rhythms. The frequency of EEG varies from 1 to 30 times per second. In general, EEG can be divided into four bands by frequency: δ (1-3 Hz), θ (4-7 Hz), α (8-13 Hz), and β (14-30 Hz). In addition, when a human is awake and focuses on something, a γ-wave with a frequency of 30-80 Hz that is higher than that of β-wave can often be seen. Other special but normal EEG, such as a hump wave, a σ wave, a λ wave, a κ-complex wave, and a μ wave, can appear during sleep.

This specification can relate to one or more systems. For example, as shown in FIG. 1, a system architecture diagram for login in this specification can include a login device 11 and a server 12. The login device 11 can be connected to the server 12 by using a network 13. The login device 11 can also be connected to a monitoring device (which is not shown in FIG. 1). Therefore, the connection between the login device 11 and the monitoring device can be wired or wireless to transmit data.

The network 13 in this specification can include a wired or wireless telecommunications apparatus, and a network apparatus that the login device 11 is based on can exchange data by using the wired or wireless telecommunications apparatus. For example, each network 13 can include a local area network ("LAN"), a wide area network ("WAN"), an intranet, an internet, a mobile phone network, a virtual private network (VPN), a cellular or other mobile communications networks, Bluetooth, NFC, or any combination thereof. In the discussion of example implementations, it should be understood that the terms "data" and "information" can be used interchangeably in this specification to refer to texts, images, audios, videos or any other form of information that can exist in a computer-based environment.

The monitoring device can be configured to monitor a user's EEG signal and transmit the detected user's EEG signal to the login device 11. The monitoring device can be provided with an EEG chip, an EEG sensor, and a data transmission apparatus. The EEG sensor, such as a dry electrode, is configured to collect EEG signals generated by the brain. Generally, EEG signals collected by the EEG sensor are usually weak, and can include a large number of noise signals (for example, can be derived from unconscious blinks, ambient effects, distracting thoughts in the brain, etc.). The EEG chip can integrate functions such as EEG signal filtering (wave filtering), amplification, analogic to digital conversion (A/D conversion), and data processing and analysis. The filtering is to filter the collected EEG so the noise signals in the EEG can be filtered out, and anti-interference performance can be improved. The A/D conversion is to convert an analog signal into a digital signal so the EEG signal is quantized to a series of digital values. Through data processing and analysis, complex EEG can be decomposed to different brain state values (for example, which include but are not limited to values of concentration, relaxation, brain activity, familiarity, vigilance, and creativity). The data transmission apparatus is configured to transmit the EEG information processed by the EEG chip to the login device 11. The data transmission apparatus can include a wired or wireless telecommunications apparatus, and the data transmission apparatus that the monitoring device is based on can transmit or exchange data by using the wired or wireless telecommunications apparatus. For example, the wired or wireless telecommunications apparatus can include a local area network ("LAN"), a wide area network ("WAN"), an intranet, an internet, a mobile phone network, a virtual private network (VPN), a cellular or other mobile communications networks, Bluetooth, NFC, or any combination thereof.

Figure 2:
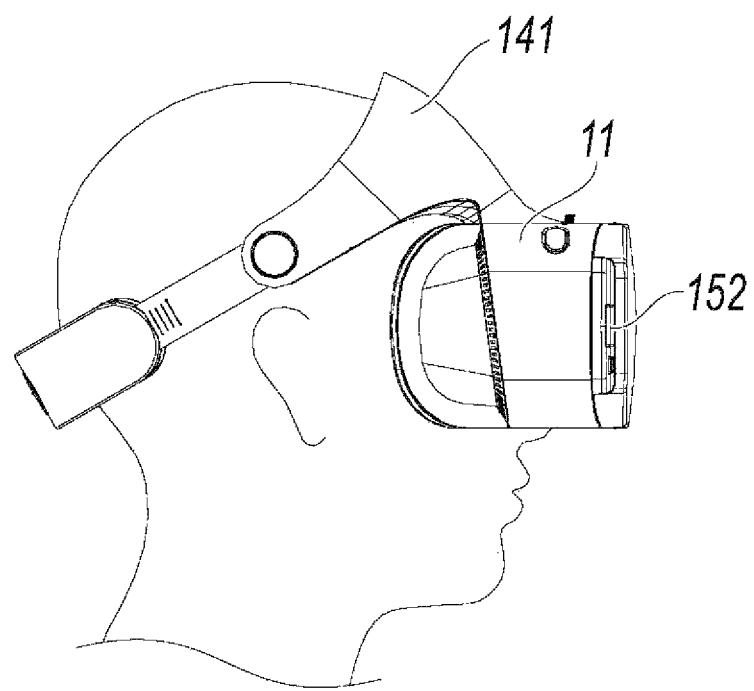
FIG. 2 is a schematic diagram illustrating a monitoring device, according to an implementation of this specification.

FIG. 2 is a schematic diagram illustrating an example monitoring device. The monitoring device 141 can be a head-mounted device that allows a user to log in by using EEG instead of his own mobile device. In FIG. 2, the login device 11 and the monitoring device 141 can be integrated, and the login device 11 can include a screen 152 that can display information to a user. The login device 11 can generate a login request based on the EEG information transmitted by the monitoring device 141, and send the login request to the server 12. It is worth mentioning that the monitoring device shown in FIG. 2 is only an example. In practice, the monitoring device can be in any form, provided that monitoring a user's EEG signal can be implemented.

The server 12 can refer to a server for login. For example, after receiving the login request sent by the login device 11, the server 12 completes login of a user account based on the login request.

Figure 3:
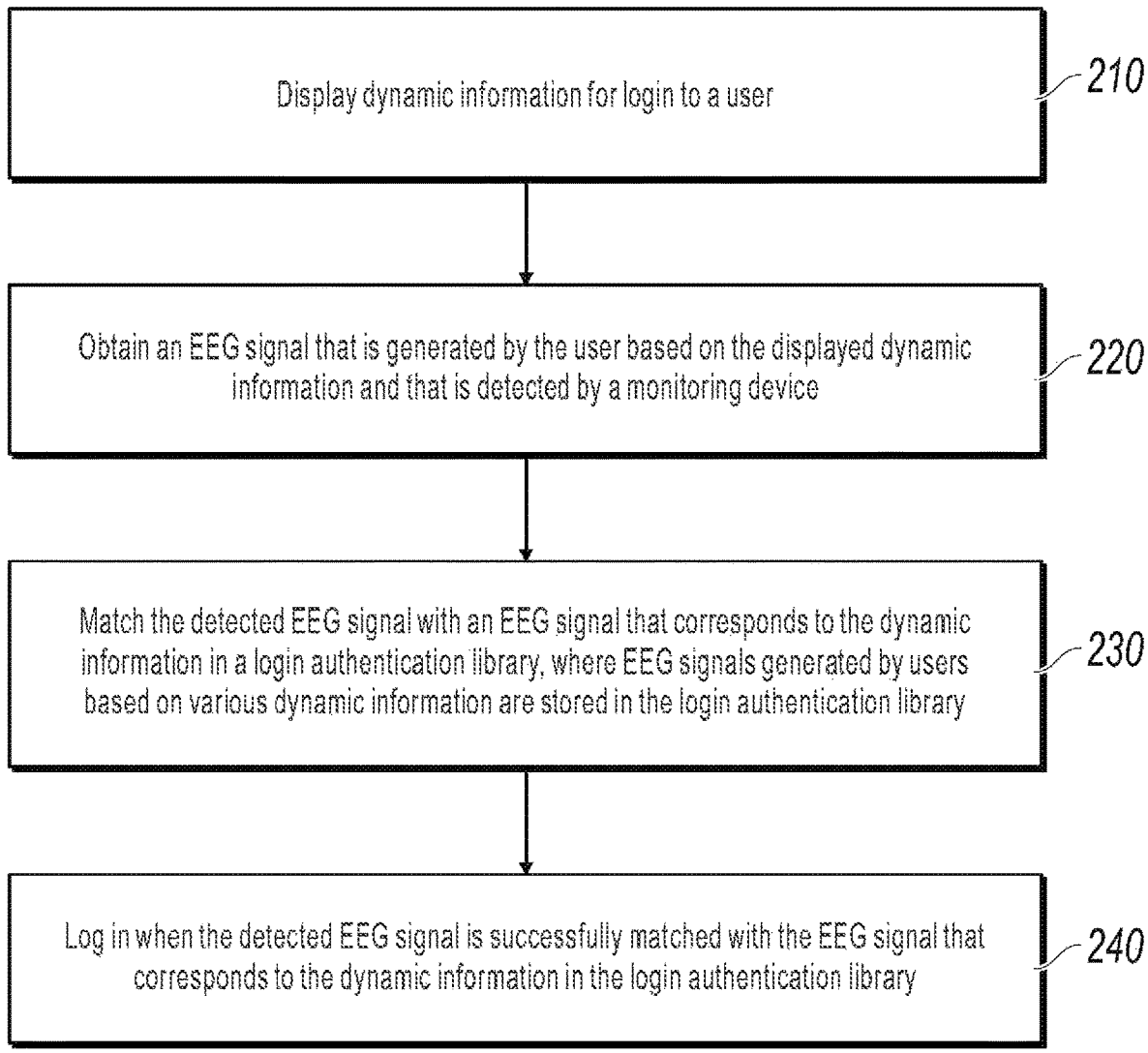
FIG. 3 is a flowchart illustrating a login method, according to an implementation of this specification.

The following describes an implementation of a login method in this specification with reference to the example shown in FIG. 3. As shown in FIG. 3, the implementation includes the following steps:

Step 210: Display dynamic information for login to a user.

The login device can display the dynamic information for login to the user. The dynamic information can be displayed in the form of text or image on the screen of the login device so the user visually obtains the dynamic information. Alternatively, the dynamic information can be played in the form of voice by using a voice playback apparatus of the login device so the user audibly obtains the dynamic information.

The dynamic information includes one or a combination of the following:

Changes in color. The login device can randomly generate information of a plurality of color changes and display the information to the user. For example, the information can be blue, green, and red, to be specific, the color displayed on the screen of the login device changes from blue to green, and then from green to red. In this case, the brain generates EEG indicating the color changes of blue, green, and red in response to the color changes displayed on the screen of the login device. In addition, the login device can play the voice indicating the color changes. Similarly, the brain generates EEG indicating the color changes in response to the voice.

Changes in blinks. The login device can randomly generate a plurality of information indicating changes in blink length and display the information to the user. For example, the information can be long, short, and long, to be specific, images or texts indicating the changes in blinks can be displayed on the screen of the login device: blink three times, the first blink time is longer, the second blink time is shorter, and the third blink time is longer. In this case, the brain generates EEG indicating the changes in blink length of long, short, and long in response to the changes in blinks displayed on the screen of the login device. In addition, the login device can play voice indicating the changes in blinks. Similarly, the brain generates EEG indicating the changes in blinks in response to the voice.

Changes in energy. The login device can randomly generate a plurality of information indicating changes in concentration and relaxation, and display the information to the user. For example, the information can be concentrated, relaxed, and concentrated, to be specific, images or texts indicating the changes in energy can be displayed on the screen of the login device: concentrated first, then be relaxed, and then be concentrated again. In this case, the brain generates EEG indicating the changes in energy in response to the changes in energy displayed on the screen of the login device. In addition, the login device can play voice indicating the changes in energy. Similarly, the brain generates EEG indicating the changes in energy in response to the voice.

It is worth mentioning that the plurality mentioned above can refer to two or more.

The dynamic information includes a combination of various types, that is, the above-mentioned changes in color, changes in blinks, and changes in energy can be randomly combined with each other, and the combination order can be random.

Step 220: Receive an EEG signal that is generated by the user based on the displayed dynamic information and that is detected by the monitoring device.

As mentioned above, the brain of the user generates the EEG of the dynamic information in response to the dynamic information for login displayed on the login device. In this case, the monitoring device can monitor the EEG signal that is generated by the user based on the displayed dynamic information, and transmit the EEG signal to the login device in a wired or wireless way.

As mentioned above, the EEG chip in the monitoring device can quantize the EEG signal to a series of digital values. Through data processing and analysis, complex EEG can be decomposed to different brain state values (for example, which include but are not limited to values of concentration, relaxation, brain activity, familiarity, vigilance, and creativity). In this implementation, the EEG signal received by the login device is a processed brain state value.

In another implementation, the monitoring device is only configured to collect EEG signals, and the EEG chip can be integrated into the login device. In this implementation, the EEG signal received by the login device is an unprocessed EEG signal.

Further, the login device needs to process the received EEG signal to obtain a brain state value. The EEG chip is also used in the processing here, and the processing procedure is the same as the previous procedure. Details are omitted here for simplicity.

Step 230: Match the detected EEG signal with an EEG signal that corresponds to the dynamic information in a login authentication library, where EEG signals generated by users based on various dynamic information are stored in the login authentication library.

After receiving or obtaining the EEG signal generated by the user based on the displayed dynamic information, the login device needs to match the EEG signal with an EEG signal that corresponds to the dynamic information in the login authentication library.

Pre-collected EEG signals generated by users based on a large quantity of dynamic information are stored in the login authentication library. Generally, when logging in by using EEG for the first time, a user is prompt to collect EEG signals generated by a brain in response to a large quantity of dynamic information.

In this case, when logging in by using the EEG subsequently, a user can log in based on the EEG signal of the user in the login authentication library.

For example, assume that the dynamic information is blue, green, and red, to be specific, the color displayed on the screen of the login device changes from blue to green, and then from green to red. Assume that the collected user's EEG signals are A, B, and C (which can refer to changes in frequency or changes in brain state values after quantification). The login device can query EEG signals that correspond to pre-collected blue, green, and red from the login authentication library. Assume that the EEG signals are A', B', and C'. Then, it is determined whether A, B, and C match A', B', and C'. If A and A' are the same, B and B' are the same, and C and C' are the same, matching succeeds. Otherwise, matching fails.

It is worthwhile to note that being the same can be being equal or similar. For example, if the difference between A and A' is less than a threshold, A and A' can be considered as the same. The threshold can be considered as a predetermined empirical value.

In practice, because EEG of a human brain can be easily affected, the EEG generated by the same person based on the same thing is slightly different. In addition, because EEG is complex, the success rate of matching is low given that EEG signals are directly matched with each other. To solve such a problem, another implementation in this specification includes the following:

The EEG signal in the login authentication library is obtained through machine learning training.

Generally, a machine learning module can train pre-collected EEG information generated by users based on a large quantity of dynamic information. By setting reasonable functions, the existing machine learning technology can be used to model the collected EEG information, and by constantly iterating and optimizing algorithms, the relationship between the attributes of each node and the weights of the attributes of each node can be calculated to determine a unified equation or a calculation formula. Generally, such an equation or a calculation formula can be referred to as a model. By using the trained EEG model, uniqueness and accuracy of a user's EEG can be determined, to be specific, the same calculation results can be obtained by the user based on the same dynamic information in different environments. By using the machine learning technology, the success rate of EEG matching can be increased, and login efficiency can be improved.

Step 240: Log in when the detected EEG signal is successfully matched with the EEG signal that corresponds to the dynamic information in the login authentication library.

The login device can log in when the detected EEG signal is successfully matched with the EEG signal that corresponds to the dynamic information in the login authentication library.

The logging in can include: generating a login request of the user, and sending the login request to the server.

Implementations of this specification provide a login method by using EEG derived from human brain consciousness. A user's brain generates an EEG signal based on dynamic information displayed on a login device. The EEG signal is then converted into a login command for login system after being collected, processed, and analyzed. The dynamic information is similar to a dynamic password that is random and disposable. Therefore, compared with the conventional login method, the login method using EEG derived from human brain consciousness is securer, more private, more interesting, and more user-friendly.

In a specific implementation of this specification, step 220 can include: receiving the EEG signal that is generated by the user based on the displayed dynamic information and that is detected by the monitoring device and a unique identification signal of EEG of the user, where the unique identification signal of the EEG is a user-specific unique EEG feature code.

Step 230 can include: matching the unique identification signal of the detected EEG in an identity authentication library, where unique identification signals of EEG that correspond to different users are stored in the identity authentication library; obtaining an EEG signal that corresponds to a target user with regard to the dynamic information from the login authentication library when the target user is matched; and matching the detected EEG signal with the EEG signal obtained from the login authentication library.

In this implementation, each person's EEG feature code is unique. Therefore, using an EEG feature code as a unique identification signal of users' EEG can effectively identify different users. Generally, the unique identification signal of the EEG can be referred to as ID information of the EEG.

Similar to the login authentication library, pre-collected unique identification information of EEG that corresponds to different users is stored in the identity authentication library. Generally, when logging in by using EEG for the first time, each user is prompted to collect the unique identification information of the EEG.

In this case, when the user logs in by using the EEG, after receiving the unique identification signal of the EEG detected by the monitoring device, the login device can traverse the identity authentication library. When the target user is matched, the EEG signal of the target user that corresponds to the dynamic information in the login authentication library is obtained. Further, the detected EEG signal generated by the user based on the displayed dynamic information is matched with the EEG signal obtained from the login authentication library.

In this implementation, login security can be further improved.

In a specific implementation of this specification, before step 210, the method further includes: monitoring a current environment to determine whether the current environment affects normal generation of the EEG.

Step 210 includes: displaying the dynamic information for login to the user when the current environment does not affect the normal generation of the EEG.

In this implementation, because EEG signals of a human brain can be easily affected by a surrounding environment, before logging in by using the EEG, the login device can monitor the current environment of the user. Only when the current environment does not affect the normal generation of the EEG, the login device displays the dynamic information for login to the user. In this case, authenticity of the collected EEG signal can be ensured, and the success rate of login by using the EEG signal can be improved.

In one implementation, the monitoring the current environment to determine whether the current environment affects the normal generation of the EEG includes: monitoring noise decibels of the current environment; determining whether the noise decibels of the current environment reach a threshold; and determining that the current environment does not affect the normal generation of the EEG when the noise decibels of the current environment do not reach the threshold.

Generally, environment noise is an important factor in affecting the normal generation of the EEG. Therefore, a sensor for monitoring the noise decibels can be disposed in the login device. Whether the current environment affects the normal generation of the EEG can be determined by monitoring the noise decibels of the current environment.

In another implementation, the monitoring the current environment to determine whether the current environment affects the normal generation of the EEG includes: monitoring luminance intensity in the current environment; determining whether the luminance intensity in the current environment reaches a threshold; and determining that the current environment does not affect the normal generation of the EEG when the luminance intensity of the current environment does not reach the threshold.

Generally, luminance intensity of an environment is an important factor in affecting the normal generation of the EEG. Therefore, a sensor for monitoring the luminance intensity can be disposed in the login device. Whether the current environment affects the normal generation of the EEG can be determined by monitoring the luminance intensity of the current environment.

It is worthwhile to note that the factors that affect the normal generation of the EEG are not limited to the environment noise and the luminance intensity, and can include any other factors that can affect the normal generation of the EEG in practice.

In a specific implementation of this specification, step 210 includes: displaying the dynamic information for login to the user when a notification that the current environment does not affect the normal generation of the EEG is received from the monitoring device.

Different from the previous implementation, in this implementation, monitoring whether the current environment affects the normal generation of the EEG can be implemented by the monitoring device. Similar to the previous implementation, a sensor for monitoring the noise decibels can be disposed in the monitoring device. Whether the current environment affects the normal generation of the EEG can be determined by monitoring the noise decibels of the current environment. A sensor for monitoring the luminance intensity can be disposed in the monitoring device. Whether the current environment affects the normal generation of the EEG can be determined by monitoring the luminance intensity of the current environment. For details, refer to the previous implementation.

In a specific implementation of this specification, based on the implementation shown in FIG. 3, after step 230, the method can further include: collecting biometric information of the user when the detected EEG signal fails to match the EEG signal that corresponds to the dynamic information in the login authentication library; and logging in based on the biometric information of the user.

In this implementation, the biometric information includes but is not limited to at least one of a fingerprint, a palm print, an iris, an eye print, a face, or a sound wave.

To collect the fingerprint of the user, the login device can be provided with a fingerprint collector.

To collect the palm print of the user, the login device can be provided with a palm print collector.

To collect the iris of the user, the login device can be provided with an iris collector.

To collect the eye print of the user, the login device can be provided with an eye print collector.

To collect the face of the user, the login device can be provided with a face collector.

To collect the sound wave of the user, the login device can be provided with a sound wave collector.

In this implementation, biometric information can be used to challenge an EEG identification result when the detected EEG signal fails to match the EEG signal that corresponds to the dynamic information in the login authentication library. If the collected user's biometric information matches the user, login can still be implemented.

In a specific implementation of this specification, before the collecting biometric information of the user, the method further includes: counting the number of EEG matching failures.

The collecting biometric information of the user includes: collecting the biometric information of the user when the number of EEG matching failures reaches a threshold.

In this implementation, the threshold can be a predetermined empirical value. In this implementation, the biometric information can be used to challenge the EEG identification result when the number of matching failures between the detected EEG signal and the EEG signal that corresponds to the dynamic information in the login authentication library reaches the threshold. If the collected user's biometric information matches the user, login can still be implemented.

Corresponding to the previous login method implementations, this specification further provides a login apparatus implementation. The apparatus implementation can be implemented by software, or can be implemented by hardware or a combination of software and hardware. Using software implementation as an example, a processor of a device in which the logical apparatus is located reads a corresponding computer program instruction in a non-volatile memory into a memory for running, and the logical apparatus is then formed. At the hardware level, a hardware structure of the device in which the login apparatus is located in this specification can include a processor, a network interface, a memory, and a non-volatile memory. Generally, the device in which the login apparatus is located in this implementation can further include other hardware based on actual functions of login, and details are omitted here.

Figure 4:
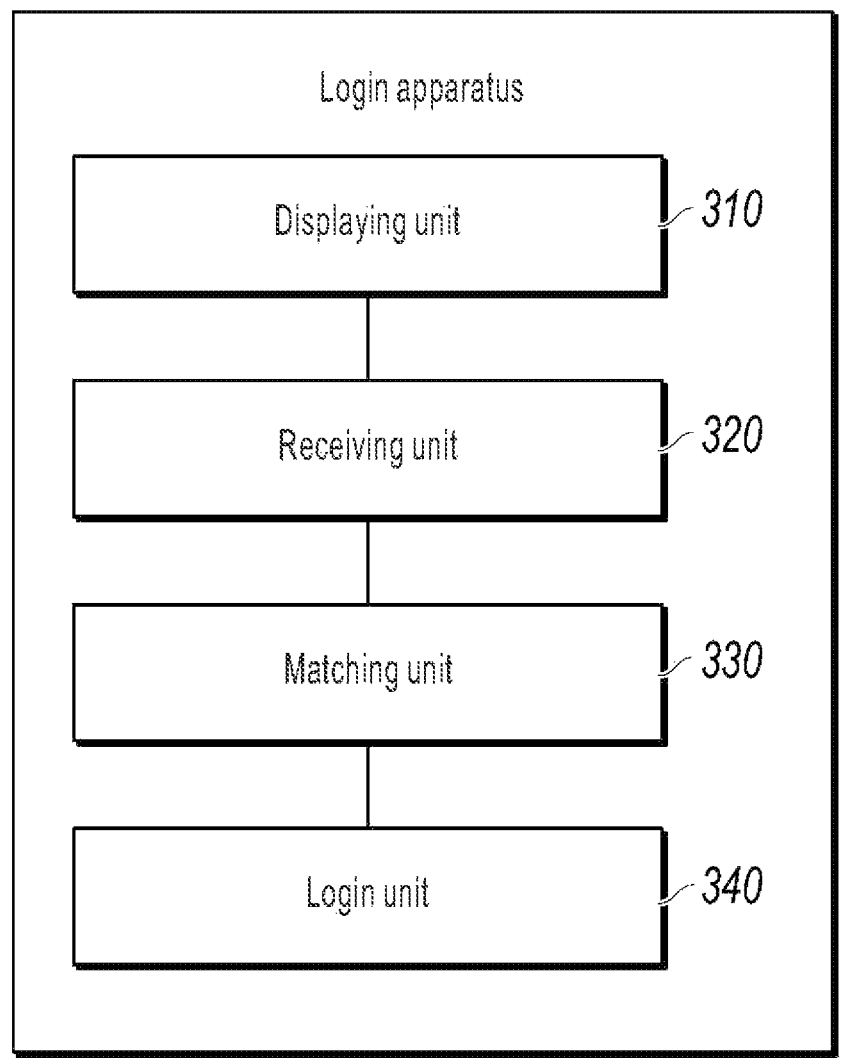
FIG. 4 is a schematic modular diagram illustrating a login apparatus, according to an implementation of this specification.

Referring to FIG. 4, which is a modular diagram illustrating a login apparatus in an implementation of this specification. The apparatus corresponds to the implementation shown in FIG. 3, and the apparatus includes: a displaying unit 310, configured to display dynamic information for login to a user; a receiving unit 320, configured to receive an EEG signal that is generated by the user based on the displayed dynamic information and that is detected by a monitoring device; a matching unit 330, configured to match the detected EEG signal with an EEG signal that corresponds to the dynamic information in a login authentication library, where EEG signals generated by users based on various dynamic information are stored in the login authentication library; and a login unit 340, configured to log in when the detected EEG signal is successfully matched with the EEG signal that corresponds to the dynamic information in the login authentication library.

In an optional implementation, the dynamic information includes any one or a combination of the following: changes in color; changes in blinks; and changes in energy.

In an optional implementation, the EEG signal in the login authentication library is obtained through machine learning training.

In an optional implementation, the receiving unit 320 includes: receiving the EEG signal that is generated by the user based on the displayed dynamic information and that is detected by the monitoring device and a unique identification signal of EEG of the user, where the unique identification signal of the EEG is a user-specific unique EEG feature code.

The matching unit 330 includes: a first matching subunit, configured to match the unique identification signal of the detected EEG in an identity authentication library, where unique identification signals of EEG that correspond to different users are stored in the identity authentication library; an obtaining subunit, configured to obtain an EEG signal that corresponds to a target user with regard to the dynamic information from the login authentication library when the target user is matched; and a second matching subunit, configured to match the detected EEG signal with the EEG signal obtained from the login authentication library.

In an optional implementation, before the displaying unit 310, the apparatus further includes: an environment determining subunit, configured to monitor a current environment to determine whether the current environment affects normal generation of the EEG.

The displaying unit 310 includes: displaying the dynamic information for login to the user when the current environment does not affect the normal generation of the EEG.

In an optional implementation, the environment determining subunit includes: a noise monitoring subunit, configured to monitor noise decibels of the current environment; a noise determining subunit, configured to determine whether the noise decibels of the current environment reach a threshold; and an environment determining subunit, configured to determine that the current environment does not affect the normal generation of the EEG when the noise decibels of the current environment do not reach the threshold.

In an optional implementation, the displaying unit 310 includes: displaying the dynamic information for login to the user when a notification that the current environment does not affect the normal generation of the EEG is received from the monitoring device.

In an optional implementation, the apparatus further includes: a collecting unit, configured to collect biometric information of the user when the detected EEG signal fails to match the EEG signal that corresponds to the dynamic information in the login authentication library; and a biometric login unit, configured to log in based on the biometric information of the user.

In an optional implementation, the collecting unit includes: a counting subunit, configured to count the number of EEG matching failures when the detected EEG signal fails to match the EEG signal that corresponds to the dynamic information in the login authentication library; and a collecting subunit, configured to collect the biometric information of the user when the number of EEG matching failures reaches a threshold.

In an optional implementation, the biometric information includes: at least one of a fingerprint, a palm print, an iris, an eye print, a face, or a sound wave.

In conclusion, this specification provides a login method by using EEG derived from human brain consciousness. A user's brain generates an EEG signal based on dynamic information displayed on a login device. The EEG signal is then converted into a login command for login system after being collected, processed, and analyzed. The dynamic information is similar to a dynamic password that is random and disposable. Therefore, compared with the conventional login method, the login method using EEG derived from human brain consciousness is safer, more private, more interesting, and more user-friendly.

The system, apparatus, module, or unit illustrated in the previous implementations can be implemented by a computer chip or an entity, or can be implemented by a product with a specified function. A typical implementation device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of these devices.

For the detailed implementation process of the functions of the units in the apparatus, refer to the implementation process of the corresponding steps in the method. Details are omitted here for simplicity.

The apparatus implementation basically corresponds to the method implementation. Therefore, for related parts, refer to partial descriptions in the method implementation. The described apparatus implementation is merely an example. The units described as separate parts can or cannot be physically separate, and parts displayed as units can or cannot be physical units, can be located in one position, or can be distributed on a plurality of network units. Some or all the modules can be selected according to actual needs to achieve the objectives of the solutions in this specification. A person of ordinary skill in the art can understand and implement the implementations of the present disclosure without creative efforts.

FIG. 4 describes internal functional modules and structures of the login apparatus, where the executive body of the login apparatus can be an electronic device in practice, including: a processor; and a memory, configured to store an instruction that can be executed by the processor; where the processor is configured to: display dynamic information for login to a user; receive an EEG signal that is generated by the user based on the displayed dynamic information and that is detected by a monitoring device; match the detected EEG signal with an EEG signal that corresponds to the dynamic information in a login authentication library, where EEG signals generated by users based on various dynamic information are stored in the login authentication library; and log in when the detected EEG signal is successfully matched with the EEG signal that corresponds to the dynamic information in the login authentication library.

Optionally, the dynamic information includes any one or a combination of the following: changes in color; changes in blinks; and changes in energy.

Optionally, the EEG signal in the login authentication library is obtained through machine learning training.

Optionally, the receiving an EEG signal that is generated by the user based on the displayed dynamic information and that is detected by a monitoring device includes: receiving the EEG signal that is generated by the user based on the displayed dynamic information and that is detected by the monitoring device and a unique identification signal of EEG of the user, where the unique identification signal of the EEG is a user-specific unique EEG feature code.

The matching the detected EEG signal with an EEG signal that corresponds to the dynamic information in a login authentication library includes: matching the unique identification signal of the detected EEG in an identity authentication library, where unique identification signals of EEG that correspond to different users are stored in the identity authentication library; obtaining an EEG signal that corresponds to a target user with regard to the dynamic information from the login authentication library when the target user is matched; and matching the detected EEG signal with the EEG signal obtained from the login authentication library.

Optionally, before the displaying dynamic information for login to a user, the method further includes: monitoring a current environment to determine whether the current environment affects normal generation of the EEG.

The displaying dynamic information for login to a user includes: displaying the dynamic information for login to the user when the current environment does not affect the normal generation of the EEG.

Optionally, the monitoring the current environment to determine whether the current environment affects the normal generation of the EEG includes: monitoring noise decibels of the current environment; determining whether the noise decibels of the current environment reach a threshold; and determining that the current environment does not affect the normal generation of the EEG when the noise decibels of the current environment do not reach the threshold.

Optionally, the displaying dynamic information for login to a user includes: displaying the dynamic information for login to the user when a notification that the current environment does not affect the normal generation of the EEG is received from the monitoring device.

Optionally, the method further includes: collecting biometric information of the user when the detected EEG signal fails to match the EEG signal that corresponds to the dynamic information in the login authentication library; and logging in based on the biometric information of the user.

Optionally, before the collecting biometric information of the user, the method further includes: counting the number of EEG matching failures.

The collecting biometric information of the user includes: collecting the biometric information of the user when the number of EEG matching failures reaches a threshold.

Optionally, the biometric information includes: at least one of a fingerprint, a palm print, an iris, an eye print, a face, or a sound wave.

In the previous implementations of the electronic device, it should be understood that the processor can be a central processing unit (CPU), or can be another general-purpose processor, a digital signal processor (DSP), an application-specific integrated circuit (ASIC), etc. The general-purpose processor can be a microprocessor or any conventional processor. The previous memory can be a read-only memory (ROM), a random access memory (RAM), a flash memory, a hard disk, or a solid-state drive. The steps of the method disclosed with reference to the implementations of the present disclosure can be directly performed by a hardware processor, or can be performed by using a combination of hardware in the processor and a software module.

The implementations in this specification are all described in a progressive method. For same or similar parts in the implementations, refer to these implementations. Each implementation focuses on a difference from other implementations. Especially, the electronic device implementations are basically similar to a method implementation, and therefore are described briefly. For related parts, refer to partial descriptions in the method implementation.

A person skilled in the art can easily figure out another implementation solution of this specification after considering the specification and practicing the disclosure that is disclosed here. This specification is intended to cover any variations, functions, or adaptive changes of this specification. These variations, functions, or adaptive changes comply with general principles of this specification, and include common knowledge or a commonly used technical means in the technical field that is not disclosed in this specification. The specification and the implementations are merely considered as examples, and the actual scope and the spirit of this specification are pointed out by the following claims.

It should be understood that this specification is not limited to the accurate structures that are described above and that are shown in the accompanying drawings, and modifications and changes can be made without departing from the scope of this specification. The scope of this specification is limited only by the appended claims.

What is claimed is:

1. A computer-implemented method, comprising:
    displaying, on a user-device, a set of dynamic information corresponding to a random combination including color changes, blink length changes, and energy changes, wherein the set of dynamic information is displayed as a part of a login process;
    receiving a first electroencephalogram (EEG) signal indicative of a user-response to the displayed dynamic information, wherein the EEG signal is detected by a monitoring device;
    determining that the first EEG signal matches a second EEG signal that corresponds to the displayed dynamic information stored in a login authentication library, wherein the login authentication library stores a plurality of template EEG signals obtained from users (during an enrollment process) as responses to corresponding sets of dynamic information; and
    in response to determining that the first EEG signal matches the second EEG signal, transmitting a login request to a server.

2. The computer-implemented method of claim 1, wherein the second EEG signal stored in the login authentication library is obtained through machine learning training.

3. The computer-implemented method of claim 1, wherein receiving the first EEG signal indicative of a user-response to the displayed dynamic information comprises receiving the first EEG signal indicative of a user-response to the displayed dynamic information and a first unique identification signal of the first EEG signal, wherein the first unique identification signal of the first EEG signal is a user-specific EEG feature; and determining that the first EEG signal matches the second EEG signal that corresponds to the displayed dynamic information comprises:
    determining that the first unique identification signal of the first EEG signal matches a second unique identification signal of a target user stored in an identity authentication library, wherein the identity authentication library stores a plurality of template unique identification signals of the plurality of template EEG signals obtained from users;
    in response, obtaining the second EEG signal that corresponds to the displayed dynamic information and corresponds to the target user from the login authentication library; and
    determining that the first EEG signal matches the second EEG signal obtained from the login authentication library.

4. The computer-implemented method of claim 1, wherein before displaying the set of dynamic information, the method further comprises determining that a current environment does not affect normal generation of the first EEG signal by monitoring the current environment; and displaying the set of dynamic information comprises:
    in response to determining that the current environment does not affect the normal generation of the EEG signal, displaying the set of dynamic information.

5. The computer-implemented method of claim 4, wherein determining that the current environment does not affect normal generation of the first EEG signal comprises:
    monitoring noise decibels of the current environment;
    determining that the noise decibels of the current environment do not reach a threshold; and
    in response to determining that the noise decibels of the current environment do not reach the threshold, determining that the current environment does not affect the normal generation of the first EEG signal.

6. The computer-implemented method of claim 1, wherein displaying the set of dynamic information comprises:
    displaying the set of dynamic information when a notification that a current environment does not affect normal generation of the first EEG signal is received from the monitoring device.

7. The computer-implemented method of claim 1, further comprises:
    collecting biometric information when the first EEG signal fails to match the second EEG signal that corresponds to the displayed dynamic information stored in the login authentication library; and
    transmitting the login request to the server, wherein the login request comprises the biometric information.

8. The computer-implemented method of claim 7, wherein before collecting biometric information, the method further comprises counting a number of EEG matching failures; and collecting biometric information comprises:
    collecting the biometric information when the number of EEG matching failures reaches a threshold.

9. The computer-implemented method of claim 7, wherein the biometric information comprises:
    at least one of a fingerprint, a palm print, an iris, an eye print, a face, or a sound wave.

10. A non-transitory, computer-readable medium storing a plurality of instructions executable by a computer system to perform operations comprising:
    displaying, on a user-device, a set of dynamic information corresponding to a random combination including color changes, blink length changes, and energy changes, wherein the set of dynamic information is displayed as a part of a login process;

receiving a first electroencephalogram (EEG) signal indicative of a user-response to the displayed dynamic information, wherein the EEG signal is detected by a monitoring device;

determining that the first EEG signal matches a second EEG signal that corresponds to the displayed dynamic information stored in a login authentication library, wherein the login authentication library stores a plurality of template EEG signals obtained from users (during an enrollment process) as responses to corresponding sets of dynamic information; and in response to determining that the first EEG signal matches the second EEG signal, transmitting a login request to a server.

11. The non-transitory, computer-readable medium of claim 10, wherein the second EEG signal stored in the login authentication library is obtained through machine learning training.

12. The non-transitory, computer-readable medium of claim 10, wherein receiving the first EEG signal indicative of a user-response to the displayed dynamic information comprises receiving the first EEG signal indicative of a user-response to the displayed dynamic information and a first unique identification signal of the first EEG signal, wherein the first unique identification signal of the first EEG signal is a user-specific EEG feature; and determining that the first EEG signal matches the second EEG signal that corresponds to the displayed dynamic information comprises:

determining that the first unique identification signal of the first EEG signal matches a second unique identification signal of a target user stored in an identity authentication library, wherein the identity authentication library stores a plurality of template unique identification signals of the plurality of template EEG signals obtained from users;

in response, obtaining the second EEG signal that corresponds to the displayed dynamic information and corresponds to the target user from the login authentication library; and determining that the first EEG signal matches the second EEG signal obtained from the login authentication library.

13. The non-transitory, computer-readable medium of claim 10, wherein before displaying the set of dynamic information, the operations further comprise determining that a current environment does not affect normal generation of the first EEG signal by monitoring the current environment; and displaying the set of dynamic information comprises:

in response to determining that the current environment does not affect the normal generation of the EEG signal, displaying the set of dynamic information.

14. The non-transitory, computer-readable medium of claim 13, wherein determining that the current environment does not affect normal generation of the first EEG signal comprises:

monitoring noise decibels of the current environment;
determining that the noise decibels of the current environment do not reach a threshold; and
in response to determining that the noise decibels of the current environment do not reach the threshold, determining that the current environment does not affect the normal generation of the first EEG signal.

15. The non-transitory, computer-readable medium of claim 10, wherein displaying the set of dynamic information comprises:

displaying the set of dynamic information when a notification that a current environment does not affect normal generation of the first EEG signal is received from the monitoring device.

16. The non-transitory, computer-readable medium of claim 10, wherein the operations further comprise:

collecting biometric information when the first EEG signal fails to match the second EEG signal that corresponds to the displayed dynamic information stored in the login authentication library; and transmitting the login request to the server, wherein the login request comprises the biometric information.

17. The non-transitory, computer-readable medium of claim 16, wherein before collecting biometric information, the operations further comprise counting a number of EEG matching failures; and collecting biometric information comprises:

collecting the biometric information when the number of EEG matching failures reaches a threshold.

18. The non-transitory, computer-readable medium of claim 16, wherein the biometric information comprises:

at least one of a fingerprint, a palm print, an iris, an eye print, a face, or a sound wave.

19. A computer-implemented system, comprising:

one or more computers; and one or more computer memory devices interoperably coupled with the one or more computers and having tangible, non-transitory, machine-readable media storing a plurality of instructions that, when executed by the one or more computers, perform operations comprising:

displaying, on a user-device, a set of dynamic information corresponding to a random combination including color changes, blink length changes, and energy changes, wherein the set of dynamic information is displayed as a part of a login process;

receiving a first electroencephalogram (EEG) signal indicative of a user-response to the displayed dynamic information, wherein the EEG signal is detected by a monitoring device;

determining that the first EEG signal matches a second EEG signal that corresponds to the displayed dynamic information stored in a login authentication library, wherein the login authentication library stores a plurality of template EEG signals obtained from users (during an enrollment process) as responses to corresponding sets of dynamic information; and in response to determining that the first EEG signal matches the second EEG signal, transmitting a login request to a server.

20. The computer-implemented system of claim 19, wherein the second EEG signal stored in the login authentication library is obtained through machine learning training.

21. The computer-implemented system of claim 19, wherein receiving the first EEG signal indicative of a user-response to the displayed dynamic information comprises receiving the first EEG signal indicative of a user-response to the displayed dynamic information and a first unique identification signal of the first EEG signal, wherein the first unique identification signal of the first EEG signal is a user-specific EEG feature; and determining that the first EEG signal matches the second EEG signal that corresponds to the displayed dynamic information comprises:
  determining that the first unique identification signal of the first EEG signal matches a second unique identification signal of a target user stored in an identity authentication library, wherein the identity authentication library stores a plurality of template unique identification signals of the plurality of template EEG signals obtained from users;
  in response, obtaining the second EEG signal that corresponds to the displayed dynamic information and corresponds to the target user from the login authentication library; and
  determining that the first EEG signal matches the second EEG signal obtained from the login authentication library.

22. The computer-implemented system of claim 19, wherein before displaying the set of dynamic information, the operations further comprise determining that a current environment does not affect normal generation of the first EEG signal by monitoring the current environment; and displaying the set of dynamic information comprises:
  in response to determining that the current environment does not affect the normal generation of the EEG signal, displaying the set of dynamic information.

23. The computer-implemented system of claim 22, wherein determining that the current environment does not affect normal generation of the first EEG signal comprises:
  monitoring noise decibels of the current environment;
  determining that the noise decibels of the current environment do not reach a threshold; and
  in response to determining that the noise decibels of the current environment do not reach the threshold, determining that the current environment does not affect the normal generation of the first EEG signal.

24. The computer-implemented system of claim 19, wherein displaying the set of dynamic information comprises:
  displaying the set of dynamic information when a notification that a current environment does not affect normal generation of the first EEG signal is received from the monitoring device.

25. The computer-implemented system of claim 19, wherein the operations further comprise:
  collecting biometric information when the first EEG signal fails to match the second EEG signal that corresponds to the displayed dynamic information stored in the login authentication library; and
  transmitting the login request to the server, wherein the login request comprises the biometric information.

26. The computer-implemented system of claim 25, wherein before collecting biometric information, the operations further comprise counting a number of EEG matching failures; and collecting biometric information comprises:
  collecting the biometric information when the number of EEG matching failures reaches a threshold.

27. The computer-implemented system of claim 25, wherein the biometric information comprises:
  at least one of a fingerprint, a palm print, an iris, an eye print, a face, or a sound wave.

\* \* \* \* \*

UNITED STATES PATENT AND TRADEMARK OFFICE
CERTIFICATE OF CORRECTION

PATENT NO. : 11,132,430 B2  
APPLICATION NO. : 16/810619  
DATED : September 28, 2021  
INVENTOR(S) : Wuzhen Xiong Page 1 of 1

It is certified that error appears in the above-identified patent and that said Letters Patent is hereby corrected as shown below:

On the Title Page

Item (71), delete "Technologies," and insert -- Technologies --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*